US006733414B2

(12) United States Patent
Elger

(10) Patent No.: US 6,733,414 B2
(45) Date of Patent: May 11, 2004

(54) GEAR ASSEMBLY FOR A POWER TOOL

(75) Inventor: William A. Elger, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 10/021,548

(22) Filed: Dec. 12, 2001

(65) Prior Publication Data

US 2002/0094907 A1 Jul. 18, 2002

Related U.S. Application Data

(60) Provisional application No. 60/261,608, filed on Jan. 12, 2001.

(51) Int. Cl.[7] ................................................ F16H 57/08

(52) U.S. Cl. ........................ 475/331; 475/149; 384/523; 384/531; 173/93; 173/109; 173/205; 173/211

(58) Field of Search ................................ 475/331, 337, 475/149; 384/523, 531; 173/93, 93.5, 93.6, 109, 176, 178, 205, 211

(56) References Cited

U.S. PATENT DOCUMENTS

| | | | |
|---|---|---|---|
| 2,463,656 | A | 3/1949 | Thomas |
| 2,637,426 | A | 5/1953 | Van Sittert |
| 3,144,108 | A | 8/1964 | Reynolds |
| 3,585,331 | A | 6/1971 | Bednardski et al. |
| 3,666,027 | A | 5/1972 | Sauerwein et al. |
| 3,699,366 | A | 10/1972 | Wood |
| 3,703,933 | A | 11/1972 | Schoeps |
| 3,734,459 | A | 5/1973 | Sauerwein et al. |
| 3,735,821 | A | 5/1973 | Hahner et al. |
| 3,759,334 | A | 9/1973 | Theurer |
| 3,768,577 | A | 10/1973 | Leoni |
| 3,780,603 | A | 12/1973 | Whitaker |
| 3,785,443 | A | 1/1974 | Armbruster |
| 3,804,180 | A | 4/1974 | Gelfand et al. |

(List continued on next page.)

*Primary Examiner*—Rodney H. Bonck
*Assistant Examiner*—David D. Le
(74) *Attorney, Agent, or Firm*—Michael Best & Friedrich LLP

(57) ABSTRACT

A gear assembly for a power tool. The gear assembly includes a gear assembly housing, a ring gear supported by the gear assembly housing, one of the gear assembly housing and the ring gear having an end defining a first bearing race, a planetary gear carrier member supported for rotation relative to the ring gear and defining a second bearing race, the carrier member being drivingly engageable with a tool element to drive the tool element, a plurality of planet gears supported by the carrier member and drivingly connectable to the gear end of the drive shaft of the motor, the plurality of planet gears interacting with a ring gear to rotatably drive the carrier member, and a plurality of bearing members supported between the first bearing race and the second bearing race.

31 Claims, 8 Drawing Sheets

U.S. PATENT DOCUMENTS 3,808,904 A 5/1974 Gotsch et al.
3,828,863 A 8/1974 Bleicher et al.
3,847,229 A 11/1974 Wanner et al.
3,848,680 A 11/1974 Legler
3,874,460 A 4/1975 Schmid et al.
3,898,911 A 8/1975 DeCaussin
3,908,766 A 9/1975 Hess
3,908,768 A 9/1975 Hess
3,952,814 A 4/1976 Gelfand et al.
4,232,750 A 11/1980 Antipov et al.
4,287,956 A * 9/1981 Maurer ...................... 173/93.5
D261,222 S 10/1981 Bunyea
4,313,505 A 2/1982 Silvern
4,316,512 A 2/1982 Kibblewhite et al.
4,353,425 A 10/1982 Simpson
4,375,040 A 2/1983 Sauerwein
4,440,238 A 4/1984 Sauerwein et al.
4,556,831 A 12/1985 Sakamoto et al.
4,567,951 A 2/1986 Fehrle et al.
4,763,031 A 8/1988 Wang
4,828,049 A * 5/1989 Preis .......................... 173/217
4,867,250 A 9/1989 Ono
5,083,619 A 1/1992 Giardino et al.
5,196,747 A 3/1993 Kress et al.
5,269,733 A * 12/1993 Anthony, III ............... 475/331
5,277,261 A 1/1994 Sakoh
5,289,885 A 3/1994 Sakoh
5,361,853 A 11/1994 Takamura et al.
5,399,129 A * 3/1995 Ciolli ......................... 475/301
5,526,460 A 6/1996 DeFrancesco et al.
5,539,844 A * 7/1996 Tazumi et al. .............. 384/531
5,544,710 A 8/1996 Groshans et al.
5,550,416 A 8/1996 Fanchang et al.
5,575,569 A * 11/1996 Shinohara ................... 384/470
5,692,575 A 12/1997 Hellstrom
5,706,902 A 1/1998 Eisenhardt
5,730,232 A 3/1998 Mixer
5,836,403 A 11/1998 Putney et al.
5,906,244 A * 5/1999 Thompson et al. ........ 173/93.5
6,158,526 A * 12/2000 Ghode et al. ................. 173/93
6,273,615 B1 * 8/2001 Obara et al. ................ 384/523
6,457,535 B1 * 10/2002 Tanaka ........................ 173/48

* cited by examiner

GEAR ASSEMBLY FOR A POWER TOOL

RELATED APPLICATION

The present application claims the benefit of prior-filed, co-pending provisional patent application Ser. No. 60/261,608, filed Jan. 12, 2001.

FIELD OF THE INVENTION

The present invention relates to power tools and, more particularly, to a gear assembly for a power tool.

BACKGROUND OF THE INVENTION

A power tool, such as an electric impact wrench, includes a tool housing, a motor supported by the tool housing and connectable to a power source, the motor including a rotatable drive shaft having a gear, a gear assembly driven by the motor, and a drive assembly driven by the gear assembly and drivingly connected to a tool element to work on a workpiece.

In a typical power tool, a separate bearing assembly is provided at the interface between the gear assembly and the drive assembly to support the driven end of the drive assembly. The separate bearing assembly generally includes a bearing support supported by the tool housing and a bearing supporting the driven end of the drive assembly. The driven end of the drive assembly extends through the bearing assembly, to the motor side of the bearing assembly, and is drivingly engaged by the gear assembly on the motor side of the bearing assembly.

SUMMARY OF THE INVENTION

One problem with the above-described power tool is that the separate bearing assembly requires additional space in and adds length to the power tool.

Another independent problem with the above-described power tool is that the bearing assembly provides a somewhat rigid and unforgiving support of the driven end of the drive assembly.

A further independent problem with the above-described power tool is that the drive assembly typically includes some axial play. Excessive axial play results in inefficiency of the drive assembly and wear on the components of the drive assembly.

The present invention provides a gear assembly for a power tool which substantially alleviates the problems with the above-described power tools. The present invention provides a gear assembly in which components of the gear assembly, such as, for example, the ring gear and the planetary gear carrier member, provide the races for the bearing assembly.

More particularly, the present invention provides a gear assembly for a power tool, the power tool including a tool housing, a motor supported by the tool housing and connectable to a power source, the motor including a rotatable drive shaft having a gear end, the motor being operable to drive a tool element driven for working on a workpiece. The gear assembly is defined as including a gear assembly housing supported by the tool housing, a ring gear supported by the gear assembly housing, a planetary gear carrier member supported for rotation relative to the ring gear and defining a bearing race, a component of the gear assembly providing another bearing race, the carrier member being drivingly engageable with the tool element to drive the tool element, a plurality of planet gears supported by the carrier member and drivingly connectable to the gear end of the drive shaft, the plurality of planet gears interacting with the ring gear to rotatably drive the carrier member, and a plurality of bearing members supported between the first bearing race and the second bearing race.

Preferably, the ring gear has an end defining the first bearing race. The gear assembly may further include an annular retainer engaging each of the plurality of bearing members. Also, the gear assembly may further include a second planetary gear carrier member supported for rotation, and a plurality of second planet gears supported by the second carrier member, the plurality of second planet gears being rotatably driven by the gear end of the drive shaft and interacting with the ring gear to rotatably drive the second carrier member. In addition, the gear assembly may further include a carrier gear supported by the second carrier member for rotation with the second carrier member, the carrier gear engaging the first-mentioned plurality of planet gears to rotatably drive the first-mentioned carrier member. Preferably, the gear assembly is a two-stage planetary gear assembly.

Also, the present invention provides a power tool including a tool housing, a motor supported by the tool housing and connectable to a power source, the motor including a rotatable drive shaft having a gear end, the motor being operable to drive a tool element for working on a workpiece, and a gear assembly. The gear assembly is defined as including a gear assembly housing supported by the tool housing, a ring gear supported by the gear assembly housing, a planetary gear carrier member supported for rotation relative to the ring gear and defining a bearing race, another component of the gear assembly providing another bearing race, the carrier member being drivingly engageable with the tool element to drive the tool element, a plurality of planet gears supported by the carrier member and drivingly connectable to the gear end of the drive shaft, the plurality of planet gears interacting with the ring gear to rotatably drive the carrier member, and a plurality of bearing members supported between the first bearing race and the second bearing race.

Preferably, the ring gear has an end defining the first bearing race. The gear assembly may further include an annular retainer engaging each of the plurality of bearing members. Also, the gear assembly may further include a second planetary gear carrier member supported for rotation, and a plurality of second planet gears supported by the second carrier member, the plurality of second planet gears being rotatably driven by the gear end of the drive shaft and interacting with the ring gear to rotatably drive the second carrier member. In addition, the gear assembly may further include a carrier gear supported by the second carrier member for rotation with the second carrier member, the carrier gear engaging the first-mentioned plurality of planet gears to rotatably drive the first-mentioned carrier member. Preferably, the gear assembly is a two-stage planetary gear assembly.

Preferably, the power tool is an impact wrench. The power tool may further include a drive assembly drivingly connectable between the gear assembly and the tool element, the drive assembly including a ram member drivingly connected to the carrier member and including a ram lug, and an anvil member rotatably supported by the tool housing and including an anvil lug engageable with the ram lug to drive the anvil member, the anvil member being drivingly connectable to the tool element to rotatably drive the tool element.

In addition, the present invention provides an impact wrench including a tool housing, a motor supported by the tool housing and connectable to a power source, the motor including a rotatable drive shaft having a gear end, the motor being operable to drive a tool element for working on a workpiece, and a gear assembly. The gear assembly is defined as including a gear assembly housing supported by the tool housing, a ring gear supported by the gear assembly housing, a planetary gear carrier member supported for rotation relative to the ring gear and defining a second bearing race, a component of the gear assembly providing another bearing race, the carrier member being drivingly engageable with the tool element to drive the tool element, a plurality of planet gears supported by the carrier member and drivingly connectable to the gear end of the drive shaft, the plurality of planet gears interacting with the ring gear to rotatably drive the carrier member, and a plurality of bearing members supported between the first bearing race and the second bearing race.

Preferably, the ring gear has an end defining the first bearing race. The gear assembly may further include an annular retainer engaging each of the plurality of bearing members. Also, the gear assembly may further include a second planetary gear carrier member supported for rotation, and a plurality of second planet gears supported by the second carrier member, the plurality of second planet gears being rotatably driven by the gear end of the drive shaft and interacting with the ring gear to rotatably drive the second carrier member. In addition, the gear assembly may further include a carrier gear supported by the second carrier member for rotation with the second carrier member, the carrier gear engaging the first-mentioned plurality of planet gears to rotatably drive the first-mentioned carrier member. Preferably, the gear assembly is a two-stage planetary gear assembly.

The impact wrench may further include a drive assembly drivingly connectable between the gear assembly and the tool element, the drive assembly including a cam shaft connected to the carrier member for rotation with the carrier member, a ram member drivingly connected to the cam shaft and including a ram lug, and an anvil member including an anvil lug engageable with the ram lug to drive the anvil member, the anvil member being drivingly connectable to the tool element to rotatably drive the tool element. Also, the power source may be a battery, and the impact wrench may further include the battery supported by the tool housing. Preferably, the battery is removably supported by the tool housing.

One independent advantage of the present invention is that the gear assembly occupies a reduced space and provides a reduced length for the power tool.

Another independent advantage of the present invention is that the components of the drive assembly provide a less rigid and more forgiving (of radial misalignment) support of the drive assembly.

A further independent advantage of the present invention is that, in some aspects of the invention, the drive assembly includes a biasing member, such as, for example, an O-ring, which takes up unwanted axial play in the drive assembly and biases or pre-stresses the components of the drive assembly forwardly into engagement, improving the efficiency of and reducing the wear on the drive assembly.

Other independent features and independent advantages of the present invention will become apparent to those skilled in the art upon review of the following detailed description, claims and drawings.

Figure 1:
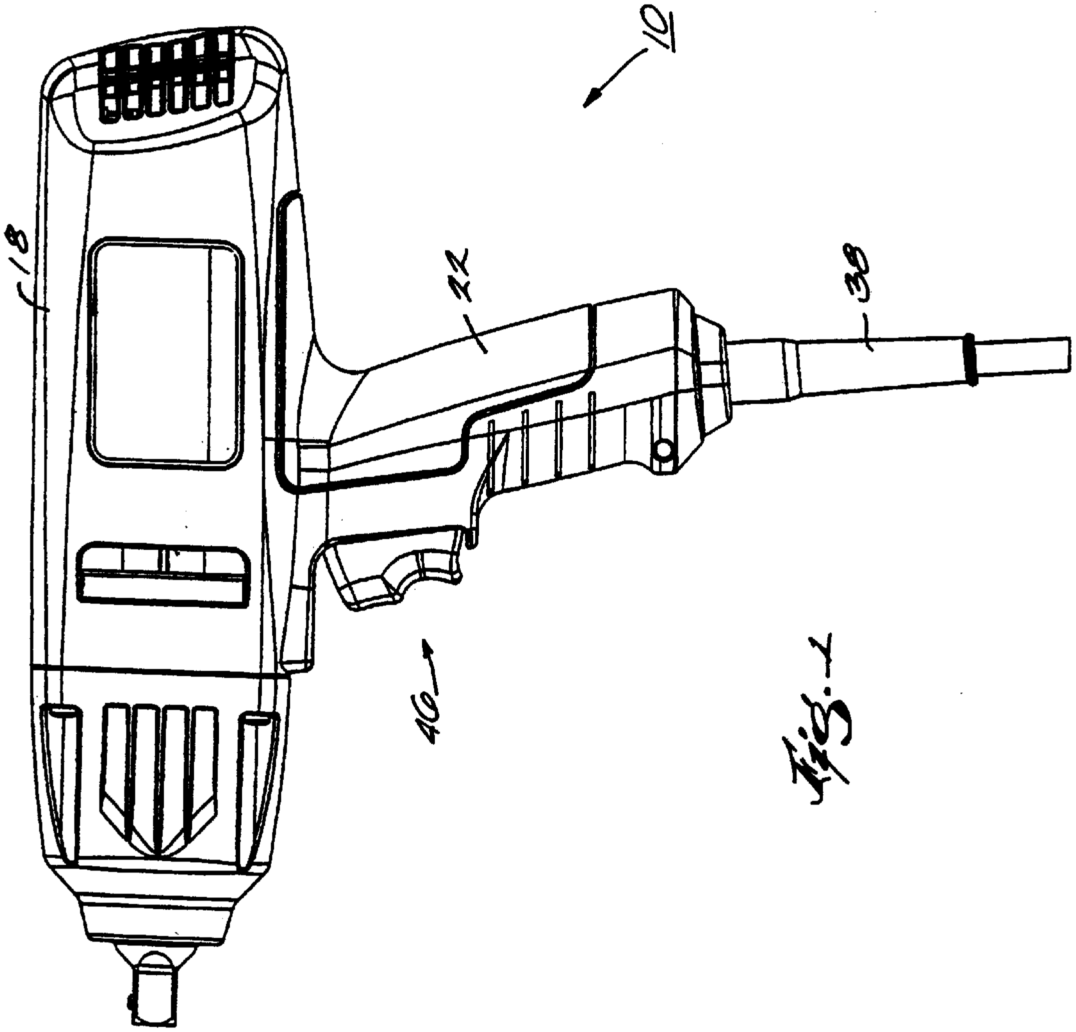
FIG. 1 is a side view of a power tool.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 2:
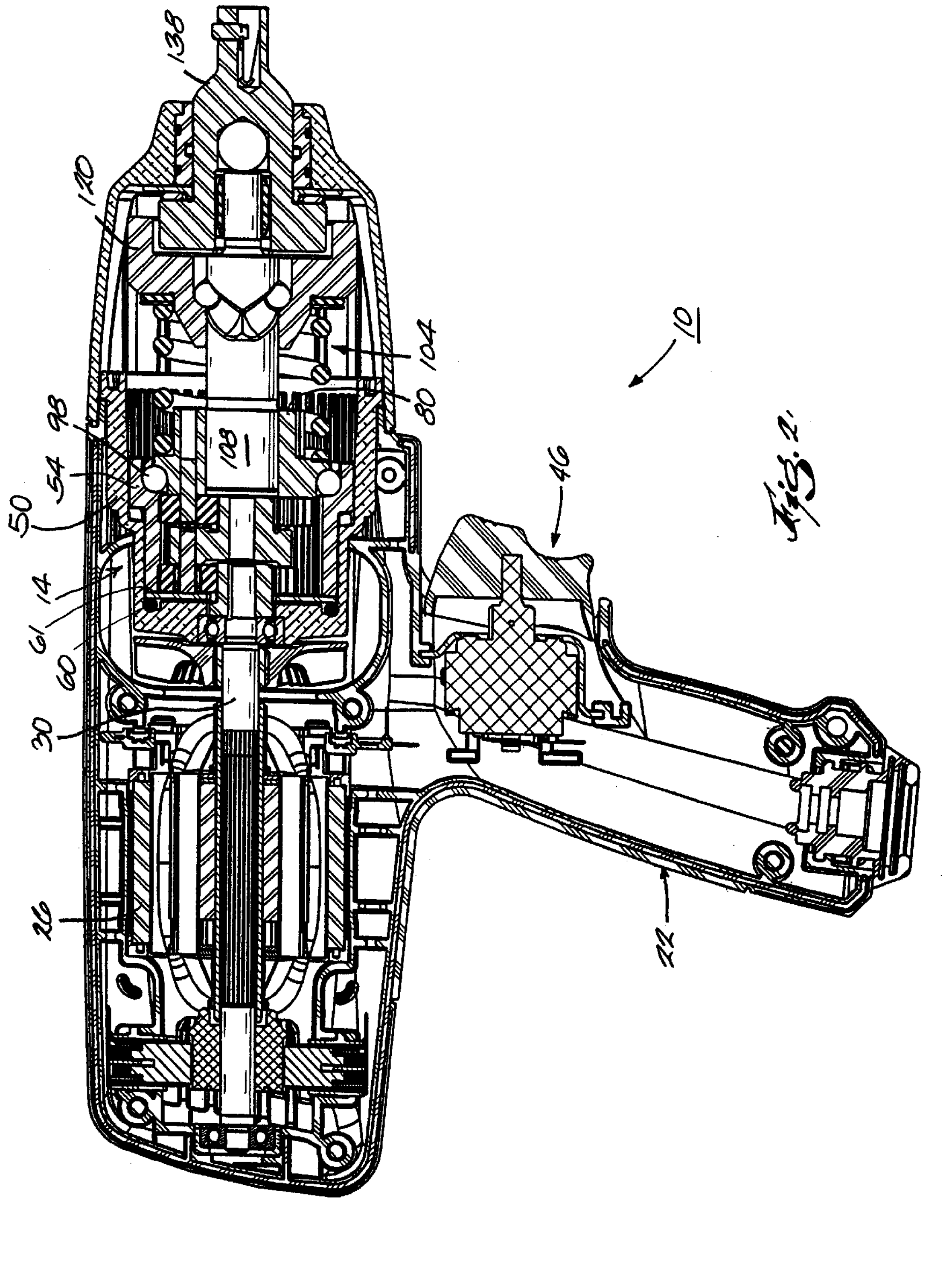
FIG. 2 is a partial cross-sectional side view of the power tool shown in FIG. 1 and illustrating a gear assembly embodying the present invention.
Figure 3:
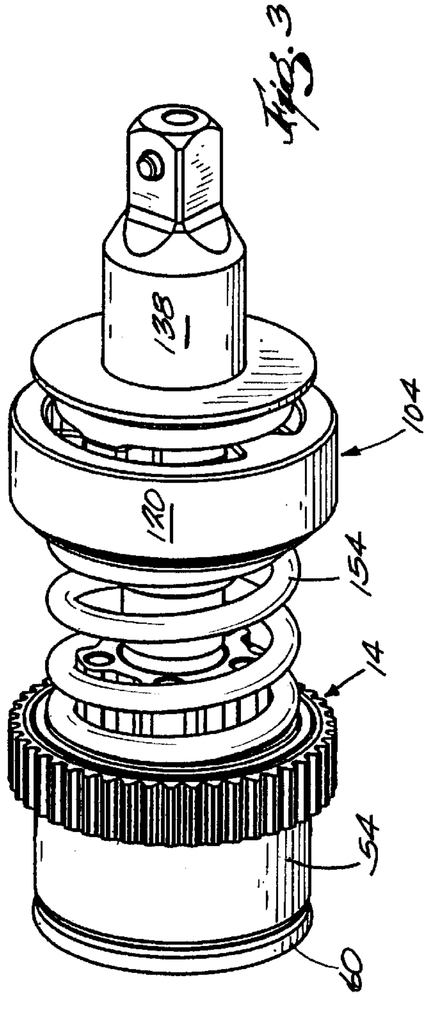
FIG. 3 is a perspective view of the gear assembly and the drive assembly shown in FIG. 2.
Figure 4:
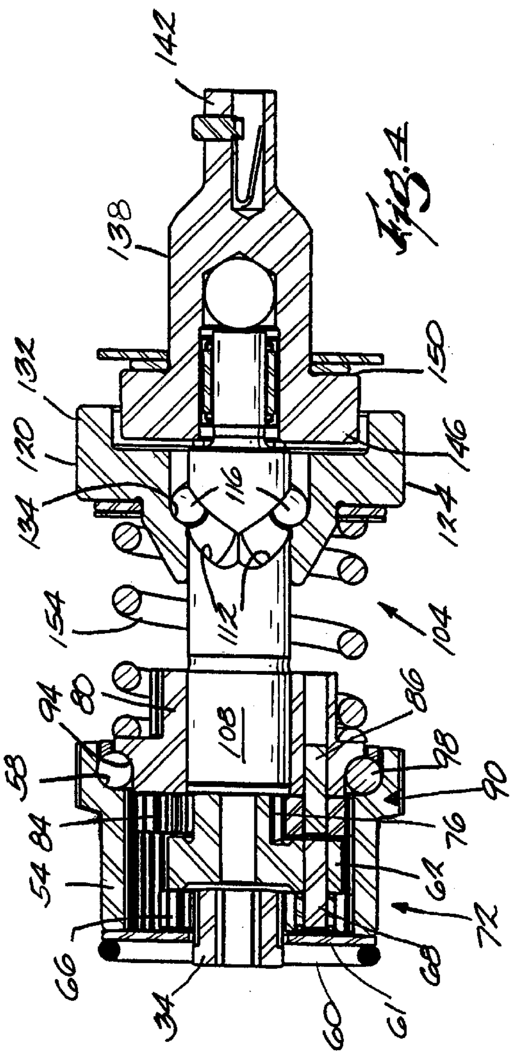
FIG. 4 is a partial cross-sectional view of the gear assembly and the drive assembly shown in FIG. 3.
Figure 5:
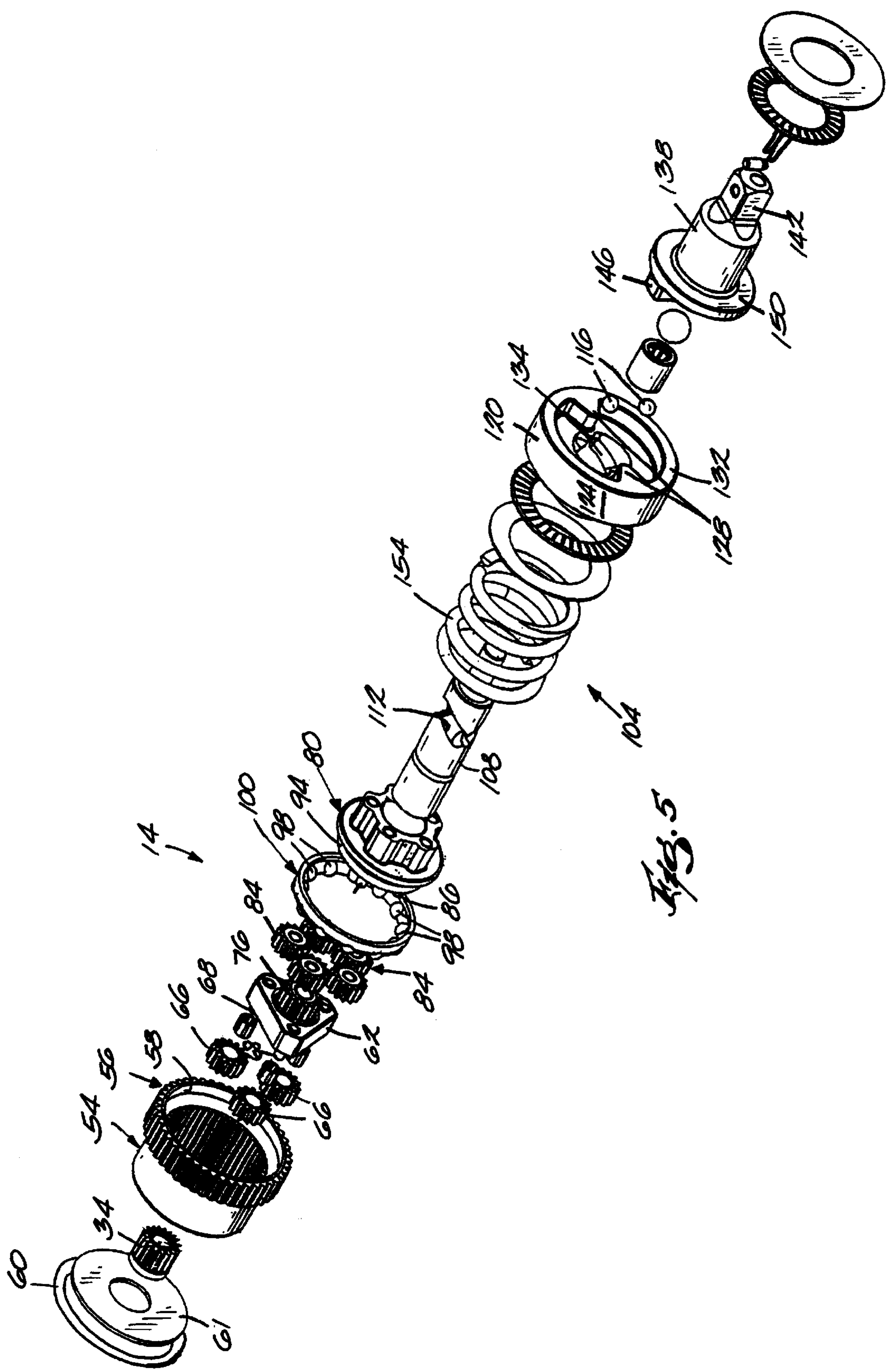
FIG. 5 is an exploded view of the gear assembly and the drive assembly shown in FIGS. 2–4.

A power tool, such as an impact wrench 10, including a gear assembly 14 embodying the invention is illustrated in the Figures. As shown in FIGS. 1–2, the impact wrench 10 includes a tool housing 18 having a handle portion 22. A reversible electric motor 26 is supported by the tool housing 18 and includes a rotatable drive shaft 30 having a gear end, such as a sun gear 34. The motor 26 is electrically connectable to a power source.

In one construction (see FIG. 1), the power source is an AC power source, and the impact wrench 10 includes a power cord 38 to connect the motor 26 to the AC power source. In an alternate construction (shown in FIG. 8), the power source is a battery power source, and the impact wrench 10A includes a battery 42A which is removably supported on the handle portion 22A. An on/off switch, such as a rocker trigger assembly 46 is supported on the handle portion 22 to electrically connect the motor 26 to the power source.

The motor 26 is operable to selectively drive a tool element, such as, in the illustrated construction, a socket member (not shown), in a forward direction, to work on or fasten a nut or bolt (not shown) or, in a reverse direction, to remove the nut or bolt from a workpiece. In other constructions, another type of tool element (not shown) may be driven.

As shown in FIGS. 2–5, the gear assembly 14 is preferably a two-stage planetary gear assembly. The gear assembly 14 includes a gear assembly housing 50 and a ring gear 54 supported by the gear assembly housing 50. The ring gear 54 has an end 56 defining a first bearing race 58. In other constructions (not shown), another component of the gear assembly 14, such as, for example, a separate bearing member (not shown), substituted for or adjacent to the end 56, may provide the first bearing race. A biasing member, such as an O-ring 60, is provided between the ring gear 54 and the gear assembly housing 50. A washer 61 provides an interface between the O-ring 60 and the ring gear 54.

The gear assembly 14 also includes a planet carrier member 62 supported for rotation relative to the gear assembly housing 50. A plurality of planet gears 66 are supported on shafts 68 for rotation with the carrier member 62 and for rotation relative to the carrier member 62. Rotation of the sun gear 34 causes rotation of the planet gears 66, and interaction between the rotating planet gears 66 and the ring gear 54 causes rotation of the carrier member 62. The sun gear 34, the carrier member 62 and the planet gears 66 provide the first stage 72 of the gear assembly 14.

The gear assembly 14 also includes a carrier gear 76 supported for rotation with the carrier member 62. Another carrier member 80 is supported for rotation relative to the gear assembly housing 50. Another plurality of planet gears 84 is supported on shafts 86 by the carrier member 80. Rotation of the carrier gear 76 with the carrier member 62 causes rotation of the planet gears 84, and interaction between the rotating planet gears 84 and the ring gear 54 causes rotation of the carrier member 80. The carrier gear 76, the carrier member 80 and the planet gears 84 provide the second stage 90 of the gear assembly 14.

The carrier member 80 defines a second bearing race 94. A plurality of bearing members 98, such as roller bearings, are supported between the first bearing race 58 and the second bearing race 94 to provide an angular contact bearing between the stationary ring gear 54 (and/or the gear housing 50) and the rotating carrier member 80. An annular contact member or retainer 100 engages each of the bearing members 98 to maintain the spaced arrangement of the bearing members 98.

In the illustrated construction, the gear assembly 14 provides a 16:1 gear reduction ratio between the motor 26 and the tool element. Preferably, each stage 72 and 90 of the gear assembly 14 has a 4:1 gear reduction ratio. It should be understood that, in other constructions (such as that shown in FIGS. 8–9), the gear assembly 14 may provide a different gear reduction ratio (i.e., 13:1 or greater). It should also be understood that each stage 72 and 90 may have a different gear reduction ratio.

Prior art gear assemblies in impact wrenches typically have a gear reduction ratio of 11:1 or less. The increased gear reduction ratio provided by the gear assembly 14 of the present invention ensures that the motor 26 operates at a more consistent rate. In other words, with a higher gear reduction ratio, a load on the tool element does not slow the motor 26 as much as with a lower gear reduction ratio. The motor 26 does not "feel" the load on the tool element.

Also, the increased gear reduction ratio of the present invention provides increased torque to the tool element. In addition, the increased gear reduction ratio allows high horsepower to be achieved with a comparatively small, lightweight motor 26 (horsepower being a function of motor speed and torque). The impact wrench 10 can thus include a smaller motor package.

The impact wrench 10 also includes a drive assembly 104 drivingly connected between the gear assembly 14 and the tool element. The drive assembly 104 includes a cam shaft 108 connected to the carrier member 80 for rotation with the carrier member 80. The cam shaft 108 defines two pair of helical cam grooves 112*a* and 112*b*. Cam balls 116 are selectively supported in each pair of cam grooves 112 (based on the selected drive direction). One pair of cam grooves, for example, cam grooves 112*a,* is provided for the forward drive of the tool element, and the other pair of cam grooves 112*b* is provided for the reverse drive of the tool element.

A wall or ridge 118 prevents a cam ball 116 from crossing over from a cam groove in one pair of cam grooves (i.e., from a forward cam groove 112*a*) to the adjacent cam groove in the other pair of cam grooves (to a reverse cam groove 112*b*), which would cause the drive assembly 104 to bind and would cause the impact wrench 10 to stop operating.

The drive assembly 104 also includes a ram member 120 drivingly connected to the cam shaft 108 for rotation with the cam shaft 108. The ram member 120 include a generally cylindrical body 124 and forwardly projecting impact or ram lugs 128. The ram lugs 128 are spaced apart about the circumference of the body 124. A raised side wall 132 extends about the periphery of the body 124 and connects the ram lugs 128. The ram member 120 also defines grooves 134 in which the cam balls 116 are supported to drivingly connect the cam shaft 108 and the ram member 120 and to allow axial movement of the ram member 120 relative to the cam shaft 108.

The drive assembly 104 also includes an anvil member 138. The anvil member 138 includes an axially-extending drive member 142, which is connectable to the tool element, and a radially-extending impact or anvil lug 146. A flange 150 supports the anvil lug 146. Each end of the anvil lug 146 provides an impact surface and is engageable with one of the ram lugs 128 to rotatably drive the anvil member 138 upon rotation of the ram member 120. The drive assembly 104 also includes a spring member 154 to bias the ram member 120 forwardly into engagement with the anvil member 138.

In operation, the operator depresses the trigger 46 to connect the motor 26 to the power source. The motor 26 rotates the drive shaft 30 and the sun gear 34 in the selected drive direction. The sun gear 34 rotates the planet gears 66, and interaction between the rotating planet gears 66 and the ring gear 54 causes rotation of the carrier member 62 and the carrier gear 76. The carrier gear 76 rotates, causing rotation of the planet gears 84, and interaction of the rotating planet gears 84 and the ring gear 54 causes rotation of the carrier member 80, the cam shaft 108 and the ram member 120.

As the ram member 120 rotates, a ram lug 128 engages each end of the anvil lug 146 to provide an impact and to rotatably drive the anvil member 138 and the tool element in the selected drive direction. After the impact, the ram member 120 moves rearwardly so that the ram lugs 128 disengage from the anvil lug 146. As the ram member 120 moves rearwardly, the cam balls 116 move rearwardly in the cam grooves 112. The spring 154 stores some of the rearward energy of the ram member 120 to provide a return mechanism for the ram member 120. After the ram lugs 128 disengage from the anvil lug 146, the ram member 120 continues to rotate and moves forwardly (as the spring 154 releases its stored energy) until the ram lugs 128 engage the opposite ends of the anvil lug 146 to cause another impact.

The O-ring 60 absorbs some axial vibration and allows some axial movement in the gear assembly 14 and the drive assembly 104. However, the O-ring 60 is axially pre-loaded or pre-stressed to bias the components of the gear assembly 14 and of the drive assembly 104 forwardly and to ensure proper engagement of the components (preventing the assemblies 14 and 104 from becoming "sloppy" axially and/or radially).

In the illustrated construction (see FIGS. 6A and 6B), the cam grooves 112 have an increased axial length and have some overlap. Accordingly, the ram member 120 has a greater degree of rearward axial movement before potentially bottoming out (if the cam balls 116 reach the rearward end of the cam grooves 112). This improves the operation of the drive assembly 104 because, if the ram member 120 bottoms out, an inconsistent impact drive cycle can result causing vibration and loss of impact energy. If the cam balls 116 impact the rearward end of the cam grooves 112, the ram member 120 can rebound, creating an "out-of-sync" condition in the drive assembly 104. However, the extended axial length of the pairs of cam grooves 112*a* and 112*b* must be optimized with the thickness of the ridge 118 to ensure that the drive assembly 104 operates effectively.

Figure 7B:
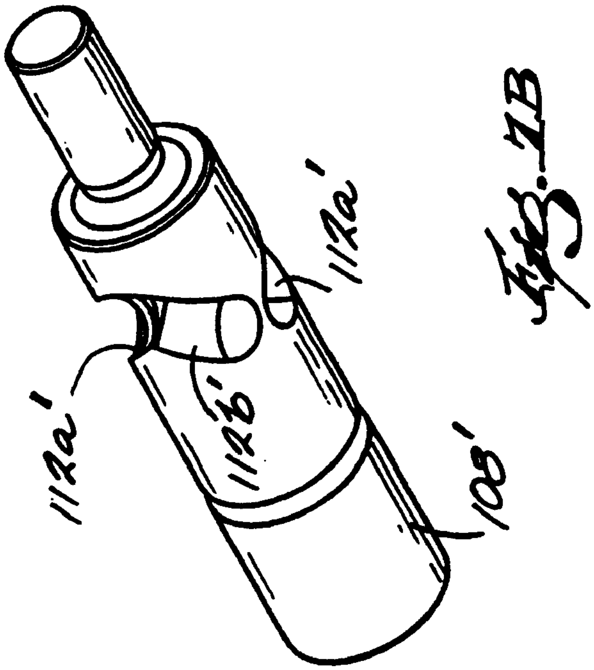
FIG. 7B is a perspective view of the cam shaft shown in FIG. 7A.
Figure 7A:
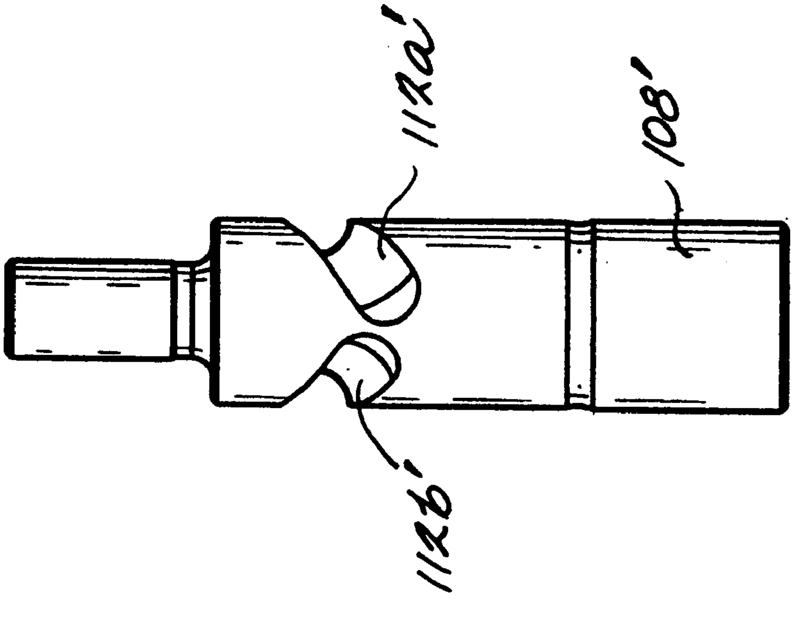
FIG. 7A is a side view of an alternate construction of a cam shaft of the drive assembly.

An alternative construction of a cam shaft 108' is illustrated in FIGS. 7A and 7B. In the alternate construction, similar components are identified by the same reference number "'".

Figure 6B:
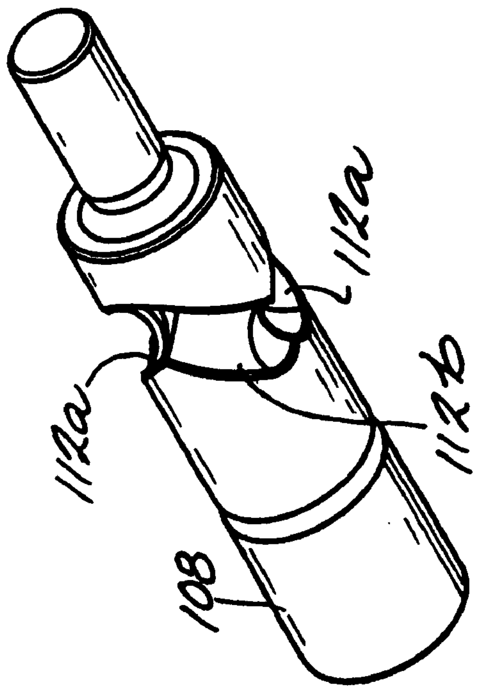
FIG. 6B is a perspective view of the cam shaft shown in FIG. 6A.
Figure 6A:
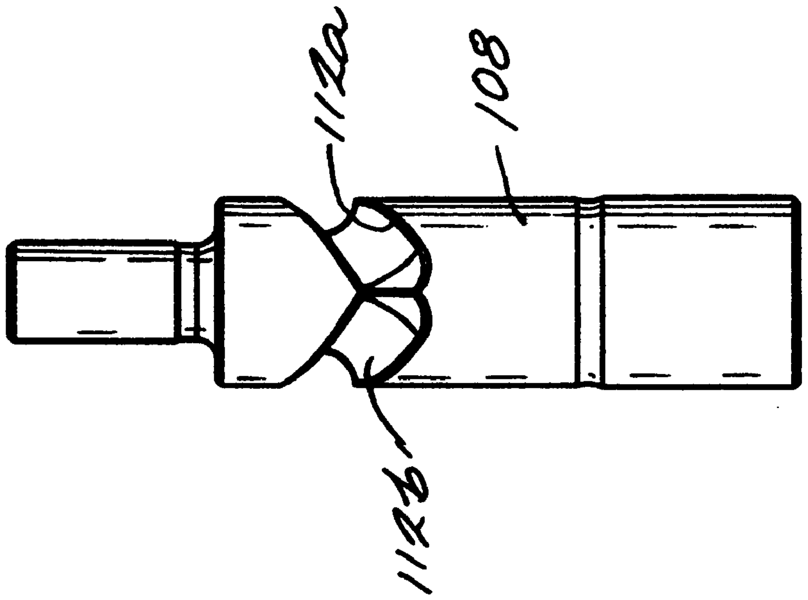
FIG. 6A is a side view of the cam shaft of the drive assembly shown in FIGS. 2–5.

In the construction shown in FIGS. 6A and 6B, both pair of cam grooves 112*a* and 112*b* have substantially the same extended axial length to provide the increased travel of the ram member 120 in both the forward and the reverse drive directions. In the alternate construction shown in FIGS. 7A and 7B, the cam grooves 112*a*' and 112*b*' have a different configuration. One pair of cam grooves, for example, cam grooves 112*a*', have a substantially greater axial length than the other pair of cam grooves 112*b*'. The extended cam grooves 112*a*' have substantially the same axial length as the cam grooves 112*a* or 112*b*. However, in other constructions (not shown), the extended cam grooves 112*a*' may have an even greater axial length than the extended axial length of the cam grooves 112*a* and 112*b*.

In the alternate construction, additional axial travel of the ram member 120' is provided in only one drive direction (for example, in the forward direction) with the extended cam grooves 112*a*'. In the other drive direction (the reverse drive direction), the axial travel of the ram member 120' has been limited by the relatively shorter cam grooves 112*b*', and the additional axial travel of the ram member 120' in that drive direction has been sacrificed in favor of a thicker wall 118' and/or in favor of further axial travel in the forward drive direction.

In the alternate construction, the extended cam grooves 112*a*' are preferably provided for the forward drive direction. Typically, the forward drive direction is used more frequently (60% to 70% of use of the impact wrench 10). Also, impact conditions which may cause increased rearward travel of the ram member 120 (i.e., the tool element binding on the workpiece) occur more frequently in the forward drive direction. In the reverse direction, such binding impact conditions are also relatively short lived (i.e., once a bolt is loosened, the binding impact condition is over).

The gear assembly 14 and the drive assembly 104 of the present invention provide a more consistent blow. In many prior art power tools (discussed above), rebounding of a ram member can cause an occasional slingshot of the ram member and the "out-of-sync" condition of the drive assembly. With the present invention, any occasional slingshot of the ram member 120 is taken up by the extra axial travel distance available in the cam grooves 112 and by the O-ring 60.

The circumferential side wall 132 of the ram member 120 stiffens the ram lugs 128 and reduces the vibration and the stress wave caused by each impact. Further, the addition of the sidewall 132 shifts the weight of the ram member 120 forwardly, closer to the impacting ram lugs 128. The ram member 120 is thus more compact and provides more efficient impacting blows.

With respect to the anvil member 138, the flange 150 provides additional support to the anvil lug 146 so that the anvil lug 146 can be reduced in size. The flange 150 also provides a thrust bearing race to take up the axial pre-load provided by the forward-biasing O-ring 60.

Figure 8:
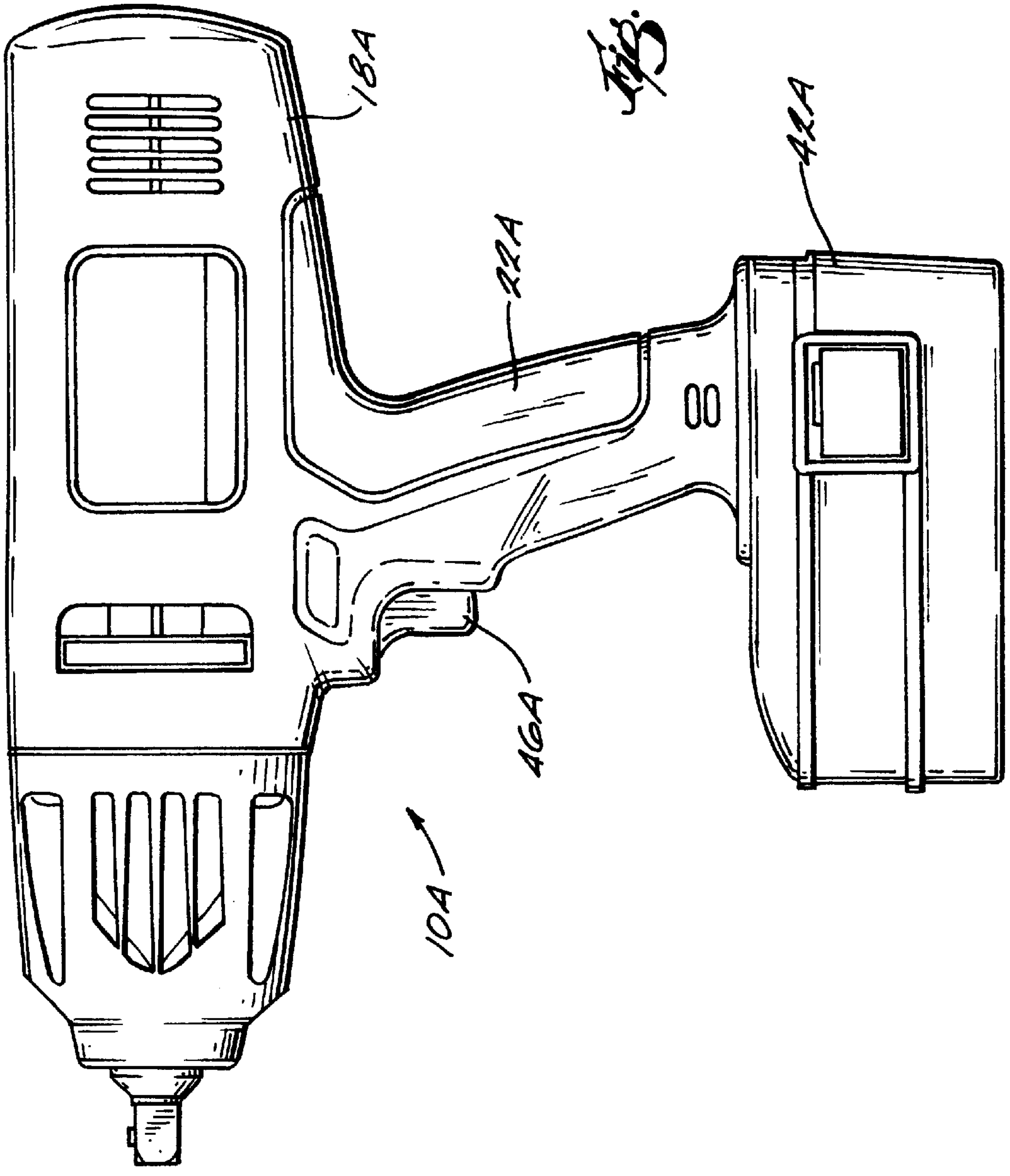
FIG. 8 is a side view of an alternate construction of the power tool shown in FIG. 1.
Figure 9:
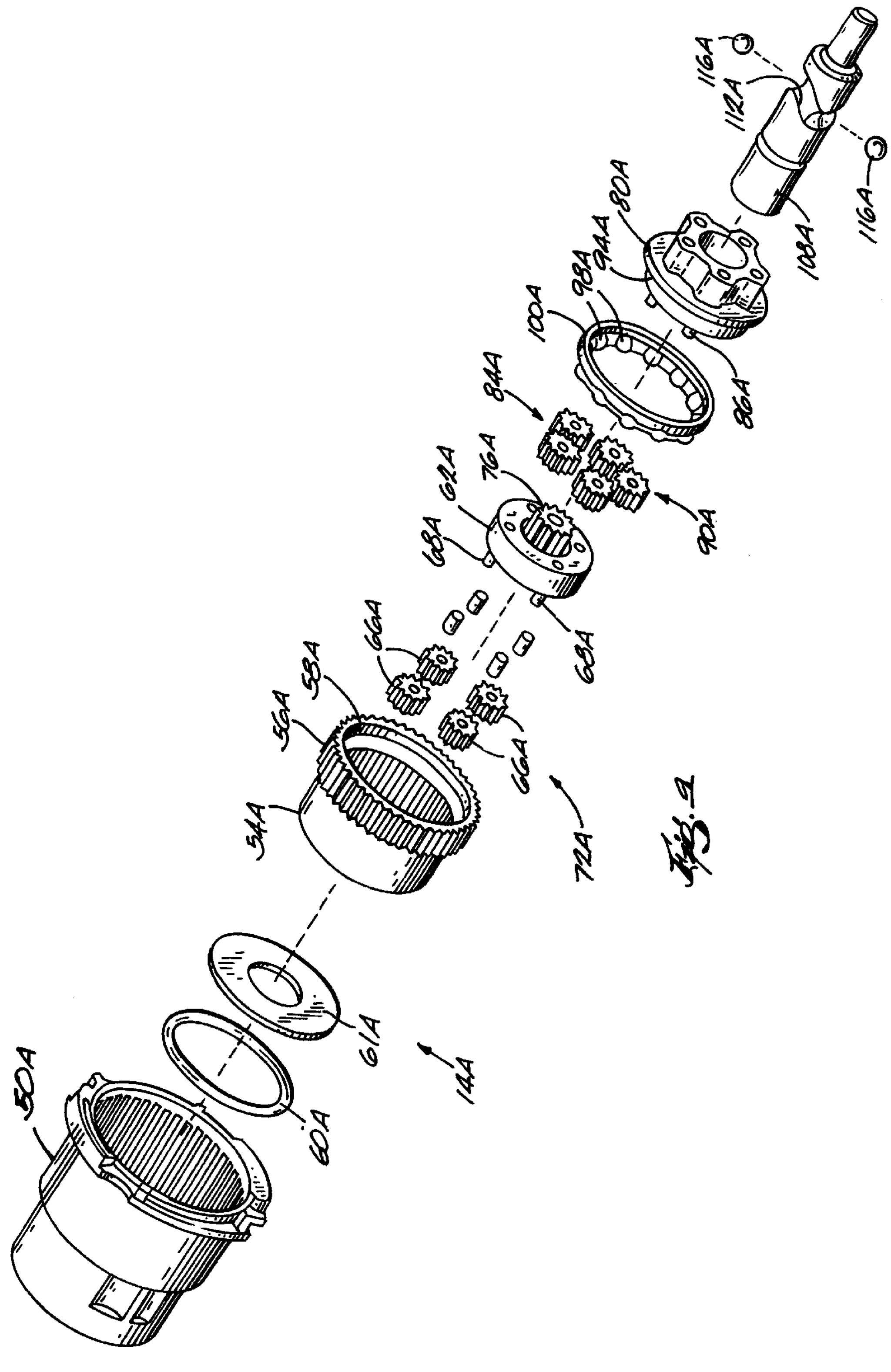
FIG. 9 is an exploded view of a gear assembly and a portion of a drive assembly for the power tool shown in FIG. 8.

An alternate construction of an impact wrench 10A and of a gear assembly 14A is illustrated in FIGS. 8–9. In the alternate construction, similar components are identified by the same reference number "A".

In this alternate construction, the impact wrench 10A is powered by a battery power source and includes the battery 42A. As shown in FIG. 9, the gear assembly 14A is also a 2-stage planetary gear assembly. The components of the first stage 72A of the gear assembly 14A have a different configuration to accommodate for the difference in the rotational speed of the battery-powered motor 26A relative to the AC-powered motor 26 of the first construction (shown in FIGS. 1–2).

In the illustrated construction, the gear assembly 14A provides a gear reduction ratio of about 13.47:1. The second stage 90A has a gear reduction ratio of 4:1, and the first stage has a gear reduction ratio of about 3.37:1. In this construction, the gear assembly 14A also provides an increased gear reduction ratio in comparison to the gear reduction ratio provided by typical prior art impact wrench gear assemblies.

Various features of the present invention are set forth in the claims.

I claim:

1. An impact wrench comprising:

a tool housing;

a motor supported by the tool housing and connectable to a power source, the motor including a rotatable drive shaft having a gear end, the motor being operable to drive a tool element for working on a workpiece;

a gear assembly including a gear assembly housing supported by the tool housing, a ring gear supported by the gear assembly housing, one of the gear assembly housing and the ring gear having an end defining a first bearing race, a planetary gear carrier member supported for rotation relative to the ring gear and defining a second bearing race, the carrier member being drivingly engageable with the tool element to drive the tool element, a plurality of planet gears supported by the carrier member and drivingly connectable to the gear end of the drive shaft, the plurality of planet gears interacting with the ring gear to rotatably drive the carrier member, and a plurality of bearing members supported between the first bearing race and the second bearing race;

a drive assembly drivingly connectable between the gear assembly and the tool element, the drive assembly including a cam shaft connected to the carrier member for rotation with the carrier member, a ram member drivingly connected to the cam shaft and including a ram lug, and an anvil member including an anvil lug engageable with the ram lug to drive the anvil member, the anvil member being drivingly connectable to the tool element to rotatably drive the tool element;

wherein said impact wrench is selectively operable to drive the tool element in a forward direction and in a reverse direction, wherein the cam shaft defines a helical first groove and a helical second groove, wherein the drive assembly further includes a cam ball engageable between the cam shaft and the ram member to connect the ram member to the cam shaft for rotation with the cam shaft, the ram being axially movable relative to the cam shaft, wherein, during operation in the forward direction, the cam ball is movable in one of the first groove and the second groove, and wherein, during operation in the reverse direction, the cam ball is movable in the other of the first groove and the second groove;

wherein at least one of the first groove and the second groove has an extended axial length; and wherein the first groove has a first axial length, and wherein the second groove has a second axial length, the second axial length being less than the first axial length.

2. The impact wrench as set forth in claim 1 wherein the ring gear has the end defining the first bearing race.

3. The impact wrench as set forth in claim 1 and further comprising an annular retainer engaging each of the plurality of bearing members.

4. The impact wrench as set forth in claim 1 and further comprising:

a second planetary gear carrier member supported for rotation; and a plurality of second planet gears supported by the second carrier member, the plurality of second planet gears being rotatably driven by the gear end of the drive shaft and interacting with the ring gear to rotatably drive the second carrier member.

5. The impact wrench as set forth in claim 4 and further comprising a carrier gear supported by the second carrier member for rotation with the second carrier member, the carrier gear engaging the first-mentioned plurality of planet gears to rotatably drive the first-mentioned carrier member.

6. The impact wrench as set forth in claim 1 wherein said gear assembly provides a gear reduction ratio of at least 13:1.

7. The impact wrench as set forth in claim 6 wherein said gear assembly provides a gear reduction ratio of about 16:1.

8. The impact wrench as set forth in claim 1 wherein said gear assembly is a two-stage planetary gear assembly.

9. The impact wrench as set forth in claim 8 wherein said gear assembly provides a gear reduction ratio of at least 13:1.

10. The impact wrench as set forth in claim 8 wherein said gear assembly provides a gear reduction ratio of 16:1.

11. The impact wrench as set forth in claim 8 wherein said gear assembly includes a first stage and a second stage, one of the first stage and the second stage providing a gear reduction ratio of 4:1, the other of the first stage and the second stage providing a gear reduction ratio of at least 3:1.

12. The impact wrench as set forth in claim 11 wherein the other of the first stage and the second stage provides a gear reduction ratio of 4:1.

13. The impact wrench as set forth in claim 1 wherein the power source is a battery, and wherein the impact wrench further comprises the battery supported by the tool housing.

14. The impact wrench as set forth in claim 13 wherein the battery is removably supported by the tool housing.

15. The impact wrench as set forth in claim 1 wherein the gear assembly further includes a biasing member positioned between the gear assembly housing and the ring gear, the biasing member applying a biasing force to components of the impact wrench, the biasing force being applied in a direction toward the tool element.

16. The impact wrench as set forth in claim 15 wherein the biasing member is an O-ring positioned between the gear assembly housing and the ring gear.

17. An impact wrench comprising:

a tool housing;

a motor supported by the tool housing and connectable to a power source; and a drive assembly drivingly connectable between the motor and a tool element and operable to drive the tool element for working on a workpiece, the drive assembly including a cam shaft rotatably drivable by the motor and defining a helical first groove and a helical second groove, at least one of the first groove and the second groove having an extended axial length, a ram member drivingly connected to the cam shaft and including a ram lug, a cam ball engageable between the cam shaft and the ram member to connect the ram member to the cam shaft for rotation with and axially movement relative to the cam shaft, and an anvil member including an anvil lug engageable with the ram lug to drive the anvil member, the anvil member being drivingly connectable to the tool element to rotatably drive the tool element;

wherein said impact wrench is selectively operable to drive the tool element in a forward direction and in a reverse direction, wherein, during operation in the forward direction, the cam ball is movable in one of the first groove and the second groove, and wherein, during operation in the reverse direction, the cam ball is movable in the other of the first groove and the second groove; and wherein the first groove has a first axial length, and wherein the second groove has a second axial length, the second axial length being less than the first axial length.

18. The impact wrench as set forth in claim 17, wherein the motor includes a rotatable drive shaft having a gear end, the impact wrench further comprising a gear assembly including a gear assembly housing supported by the tool housing, a ring gear supported by the gear assembly housing, one of the gear assembly housing and the ring gear having an end defining a first bearing race, a planetary gear carrier member supported for rotation relative to the ring gear and defining a second bearing race, the carrier member being drivingly engageable with the tool element to drive the tool element, a plurality of planet gears supported by the carrier member and drivingly connectable to the gear end of the drive shaft, the plurality of planet gears interacting with the ring gear to rotatably drive the carrier member, and a plurality of bearing members supported between the first bearing race and the second bearing race.

19. The impact wrench as set forth in claim 18 wherein the ring gear has the end defining the first bearing race.

20. The impact wrench as set forth in claim 18 wherein the gear assembly further includes an annular retainer engaging each of the plurality of bearing members.

21. The impact wrench as set forth in claim 18 wherein the gear assembly provides a gear reduction ratio of at least 13:1.

22. The impact wrench as set forth in claim 18 wherein the gear assembly provides a gear reduction ratio of 16:1.

23. The impact wrench as set forth in claim 18, wherein the cam shaft is connected to the carrier member for rotation with the carrier member.

24. The impact wrench as set forth in claim 18, wherein the drive assembly is connected between the gear assembly and the tool element.

25. The impact wrench as set forth in claim 18 wherein the gear assembly further includes a second planetary gear carrier member supported for rotation, and a plurality of second planet gears supported by the second carrier member, the plurality of second planet gears being rotatably driven by the gear end of the drive shaft and interacting with the ring gear to rotatably drive the second carrier member.

26. The impact wrench as set forth in claim 25 wherein the gear assembly further includes a carrier gear supported by the second carrier member for rotation with the second carrier member, the carrier gear engaging the first-mentioned plurality of planet gears to rotatably drive the first-mentioned carrier member.

27. The impact wrench as set forth in claim 18 wherein the gear assembly is a two-stage planetary gear assembly.

28. The impact wrench as set forth in claim 27 wherein the gear assembly provides a gear reduction ratio of at least 13:1.

29. The impact wrench as set forth in claim 28 wherein the gear assembly provides a gear reduction ratio of 16:1.

30. The impact wrench as set forth in claim 27 wherein the gear assembly includes a first stage and a second stage, one of the first stage and the second stage providing a gear reduction ratio of 4:1, the other of the first stage and the second stage providing a gear reduction ratio of at least 3:1.

31. The impact wrench as set forth in claim 30 wherein the other of the first stage and the second stage provides a gear reduction ratio of 4:1.

* * * * *